US009789950B1

(12) United States Patent
Most et al.

(10) Patent No.: US 9,789,950 B1
(45) Date of Patent: Oct. 17, 2017

(54) UNMANNED AERIAL VEHICLE (UAV) WITH MULTI-PART FOLDABLE WINGS

(71) Applicant: Bird Aerospace LLC, Fayetteville, NC (US)

(72) Inventors: Matthew I. Most, Boulder, CO (US); Trevor G. Vita, Boulder, CO (US)

(73) Assignee: BIRD AEROSPACE LLC, Fayetteville, NC (US)

( * ) Notice: Subject to any disclaimer, the term of this patent is extended or adjusted under 35 U.S.C. 154(b) by 402 days.

(21) Appl. No.: 14/260,889

(22) Filed: Apr. 24, 2014

Related U.S. Application Data

(60) Provisional application No. 61/815,285, filed on Apr. 24, 2013.

(51) Int. Cl.
| | | |
|---|---|---|
| *B64C 3/56* | (2006.01) | |
| *B64F 1/04* | (2006.01) | |
| *B64C 39/02* | (2006.01) | |
| *B64D 47/08* | (2006.01) | |

(52) U.S. Cl.
CPC .............. *B64C 3/56* (2013.01); *B64C 39/024* (2013.01); *B64D 47/08* (2013.01); *B64F 1/04* (2013.01); *B64C 2201/021* (2013.01); *B64C 2201/08* (2013.01); *B64C 2201/102* (2013.01); *B64C 2201/121* (2013.01); *B64C 2201/127* (2013.01); *B64C 2201/201* (2013.01)

(58) Field of Classification Search
CPC ....... B64C 3/56; B64C 1/30; B64C 2201/201; B64C 2201/20; B64C 2201/102; B64C 2201/088; B64C 2201/086; B64C 2201/084; B64C 2201/082; B64C 2201/08; B64F 1/04; B64F 1/06; B64F 1/08; B64F 1/10
See application file for complete search history.

(56) References Cited

U.S. PATENT DOCUMENTS

| | | | | |
|---|---|---|---|---|
| 4,336,914 | A * | 6/1982 | Thomson | ................ F42B 10/20 244/3.27 |
| 4,884,766 | A * | 12/1989 | Steinmetz | ............... F42B 10/20 244/3.27 |
| 6,056,237 | A | 5/2000 | Woodland | |
| 6,392,213 | B1 * | 5/2002 | Martorana | ............ B64C 39/024 244/13 |

(Continued)

FOREIGN PATENT DOCUMENTS

| | | |
|---|---|---|
| EP | 1594736 B1 | 11/2005 |
| GB | 2434783 A | 8/2007 |

(Continued)

*Primary Examiner* — Richard R Green
(74) *Attorney, Agent, or Firm* — Olive Law Group, PLLC; Nathan P. Letts (57) ABSTRACT

The present invention is a canister-launched pyrotechnically actuated folding wing UAV. The invention features a method for reliable and irreversible locking of a foldable wing, while enabling compact storage, cost reduction, ease of deployment and aerodynamic performance unattainable in current folding-wing designs. In a specific embodiment, the UAV is pre-packaged in a deployment canister for single-button deployment. The UAV can be offered in a rental system in which part or the entirety of the device can be returned for refurbishing. Additionally, the device can be provided as a fully expendable unit.

11 Claims, 10 Drawing Sheets

(56) References Cited

U.S. PATENT DOCUMENTS

| | | | |
|---|---|---|---|
| 7,097,133 B2 * | 8/2006 | Elam | B64C 39/024 244/131 |
| 8,056,461 B2 | 11/2011 | Bossert et al. | |
| 8,146,855 B2 | 4/2012 | Ismailov | |
| 8,439,301 B1 | 5/2013 | Lussier et al. | |
| 8,444,082 B1 | 5/2013 | Foch | |
| 2005/0006525 A1 | 1/2005 | Byers et al. | |
| 2008/0149758 A1 | 6/2008 | Colgren et al. | |
| 2009/0134273 A1 | 5/2009 | Page et al. | |
| 2009/0206196 A1 | 8/2009 | Parks et al. | |
| 2010/0012774 A1 | 1/2010 | Fanucci et al. | |
| 2010/0281745 A1 | 11/2010 | Condon et al. | |
| 2011/0147515 A1 | 6/2011 | Miller et al. | |
| 2012/0205488 A1 | 8/2012 | Powell et al. | |
| 2013/0146716 A1 | 6/2013 | Gettinger | |

FOREIGN PATENT DOCUMENTS

| | | |
|---|---|---|
| WO | 2011/066030 A2 | 6/2011 |
| WO | 2013/066439 A1 | 5/2013 |

* cited by examiner

UNMANNED AERIAL VEHICLE (UAV) WITH MULTI-PART FOLDABLE WINGS

CROSS REFERENCE TO RELATED APPLICATIONS

This application claims the benefit of U.S. Provisional Application No. 61/815,285, filed Apr. 24, 2013; inventors, Matthew I. Most and Trevor G. Vita; entitled "Canister-launched Pyrotechnically-actuated Folding Wing UAV" which is hereby incorporated by reference in its entirety.

1. FIELD OF THE INVENTION

The present invention is in the technical field of unmanned aerial vehicles (UAVs). More particularly, the present invention is directed to a foldable, canister-deployed UAV.

2. BACKGROUND OF THE INVENTION

2.1. Introduction

The recent and substantial decrease in cost of microelectronics related to sensing, flight control, and networking have facilitated the design of disposable, low cost UAVs for single-mission applications. Existing designs for folding-wing-locking mechanisms and canister-based launchers involve the use of heavy, expensive hardware such as latches, springs and hydraulic actuators. These mechanisms allow for reversibility and reliability over hundreds of cycles but they are very heavy and expensive.

US Pat. Appn. Pub. No. 2008/0149758 (Colgren et al.) discloses a modular UAV with two or four detachable wing sections that may be assembled on site to construct the functional UAV. On site assembly prior has many shortcomings such as requiring time and exposure in a potentially hazardous launch area.

U.S. Pat. No. 8,146,855 (Ismailov et al.) discloses a jet engine launched UAV with a tripartite hinged wing and a deployment mechanism at each hinge point designed to be reloaded into a pod for subsequent use. The hinged wings are designed to be reversibly opened and closed.

US Pat. Appn. Pub. No. 2009/0206196 (Parks et al.) discloses a very high altitude aircraft with a foldable wing with inflatable ribs and rigid hinged elements. The wing elements may be reversibly inflated for use or deflated for storage and require continuous gas pressure to maintain the flight configuration.

3. SUMMARY OF THE INVENTION

However, heavy expensive hardware are unnecessary if not undesirable for single-use UAVs. This invention is directed to a reliable and lightweight launching and wing-locking system for foldable UAVs which have clear advantages including the reduction of system cost and weight and an increase in flight endurance and aerodynamic performance.

The present invention is a canister-launched pyrotechnically actuated folding wing UAV. In one embodiment, the invention features a method for reliable and irreversible locking of a foldable wing, while enabling compact storage, cost reduction, ease of deployment and aerodynamic performance unattainable in current folding-wing designs.

In particular non-limiting embodiments, the present invention provides an unmanned aerial vehicle comprising: a fuselage; a multi-part foldable wing attached to the fuselage and configured to move between a folded stowed configuration and an unfolded flight configuration; and a deployable irreversible locking mechanism configured to irreversibly lock the multi-part foldable wing in the unfolded flight configuration.

The deployable locking mechanism may comprise a locking cord connected to the multi-part foldable wing which may be configured to be deployed by a pyrotechnic actuator. The multi-part foldable wing comprises a plurality of components that each comprise an adhesive-coated surface to adhere the components together in the unfolded flight configuration.

The unmanned aerial vehicle in the folded stowed configuration may be contained in a launch canister. The launch canister is configured to be opened by an electronic triggering mechanism.

The multi-part foldable wing may be foam-filled or molded foam construction. The fuselage or the multi-part foldable wing may have a camera.

The invention also provides a ground launched unmanned aerial vehicle comprising: a launch canister; a fuselage; a multi-part foldable wing attached to the fuselage and configured to move between a folded stowed configuration and an unfolded flight configuration; wherein the multipart foldable wing and fuselage are configured to fit within the launch canister; and a deployable irreversible locking mechanism configured to irreversibly lock the multi-part foldable wing in the unfolded flight configuration.

5. DETAILED DESCRIPTION OF THE INVENTION

In a specific embodiment, the UAV is pre-packaged in a deployment canister. In a preferred embodiment, the canister is made of carbon fiber. In alternative embodiments, any high-strength impact resistant polycarbonate or other high performance polymer may be used. The deployment canister is pre-packaged in a launch tube. In the pre-deployment state, the UAV is in a folded configuration. During launch, the deployment canister is ejected vertically from the launch tube. In one embodiment, the black powder is used to eject the canister from the launch tube. Alternative embodiments include launch by high pressure gas either stored in a cylinder or generated using the technologies such airbag gas generators, e.g. sodium azide and potassium nitrate to make nitrogen gas. One of ordinary skill would recognize that alternative launch systems may be used such as elastic band type launchers, hydraulic or electric rail guns, or pneumatic launchers.

When the canister reaches a suitable altitude, the canister opens and the wing unfolds. The canister opening and wing unfolding may be triggered by an onboard altimeter, an onboard accelerometer, or by a signal from a ground based control station. When the wing reaches the fully open position, it is locked rigidly and irreversibly in this position through the tightening of a cord running along the length of the wing and spanning multiple adjacent hinged sections. Tension is achieved by the movement of a piston, which is driven by the expansion of a pyrotechnic charge. The pyrotechnic charge may be the same as used for the launch or a different system based on design considerations. In one embodiment, wing rigidity is further facilitated by the contact and union of two adhesive-coated surfaces, which bond to complete the locking process. The adhesive is affixed to each mating hinge surface, and the two pieces come together when the wing opens. The adhesive may be double-sided foam tape such as a multipurpose foam tape made of polyurethane. One of ordinary skill would recognize that there are many options for double-sided tape or paint-on adhesives, including contact cement to irreversibly lock the multi-part wing in the flight configuration.

The wings and fuselage may be foam filled or of molded foam construction. The foam may be a polyethylene foam, a polypropylene foam, polystyrene foam, or a polyurethane foam such as expanded polyethylene (EPE), expanded polypropylene (EPP), or expanded polystyrene (EPS). Polymerized foams are available from vendors such as Clark Foams (Chicago, Ill.).

The UAV may be a glider or propelled by a battery powered electric propulsion system, e.g., a motor driven propeller or a liquid fuel based propulsion system. The batteries or fuel would be stored in the fuselage. The UAV will also include ailerons on the trailing edge of the multipart wing and an appropriate controller to guide the UAV in flight.

The UAV may be configured to carry a camera or ordnance. Non-limiting examples of ordnance include air-to-air or air-to-ground wing mounted missiles, fuselage mounted machine guns or cannons.

In a preferred embodiment, the flight ready, unfolded, UAV has a wing span of 50-60" (1.2-1.5 m) and a wing width of 20-30" (0.5-0.75 m). However, one of ordinary skill would be able to make a smaller or larger UAV with unfolded wing spans ranging from 10-200" (0.25-5.0 m) or 15-150" (0.3-4.0 m) and wing widths ranging from 6-50" (0.15-1.2 m) or 10-40" (0.25-1.0 m). Based on battery size/fuel capacity the UAV may be used directly overhead or in visible site. The UAV may have a range of 1-5 miles (1.6-8.0 km), 5-20 miles (8.0-32 km), 10-100 miles (16-160 km), or even 50-500 miles (80-800 km).

For markets where cost is of primary importance, the UAV may distributed using a rental-based system. Here, the UAV arrives packaged in launch-ready condition. After launch and use, the plane is recovered by the operator. The operator removes the outer wing sections to reduce the size of the airframe until it fits easily into the launch tube. The launch tube is sealed and shipped to the manufacturer for refurbishing.

For applications that require large numbers of UAVs to be deployed at once or require periodic deployments to maintain aerial presence, UAVs can be stored in a battery and triggered remotely.

To facilitate easy transport, the launch tube is designed to be stackable.

Unless defined otherwise, all technical and scientific terms used herein have the same meaning as commonly understood by one of ordinary skill in the art to which this invention belongs. The article "a" and "an" are used herein to refer to one or more than one (i.e., to at least one) of the grammatical object(s) of the article. By way of example, "an element" means one or more elements.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present invention may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

The following Examples further illustrate the invention and are not intended to limit the scope of the invention. In particular, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

6. EXAMPLES

An illustrative embodiment will now be described with reference to the accompanying drawings.

The invention is a canister-deployed unmanned aerial vehicle (UAV) equipped with a two-stage pyrotechnically actuated wing-locking mechanism. In the pre-deployment state, the UAV was stowed in a folded configuration inside a deployment canister, such as a carbon fiber canister, such that a loss of containment by the canister results in rapid unfolding of the UAV into flight configuration. The deployment canister may come pre-packaged in a launch tube for rapid, single-stage deployment.

In the pre-deployment state, the UAV is in a folded configuration. During launch, the deployment canister is ejected vertically from the launch tube. When the canister reaches a suitable altitude, the canister opens and the wing unfolds. When the wing reaches the fully open position, it is locked rigidly in this position through the tightening of a cord running along the length of the wing and spanning multiple adjacent hinged sections. The hinge may be made of a reinforced tape, such as a rip-stop nylon tape. Alternatively, the hinge may be a mechanical hinge such as a piano hinge. Tension is achieved by the movement of a piston, which is driven by the expansion of a pyrotechnic charge such as those described above. In one embodiment, wing rigidity is further facilitated by the contact and union of two adhesive-coated surfaces, which surfaces bond to complete the locking process, such as the double-sided foam backed tape described above.

Figure 1:
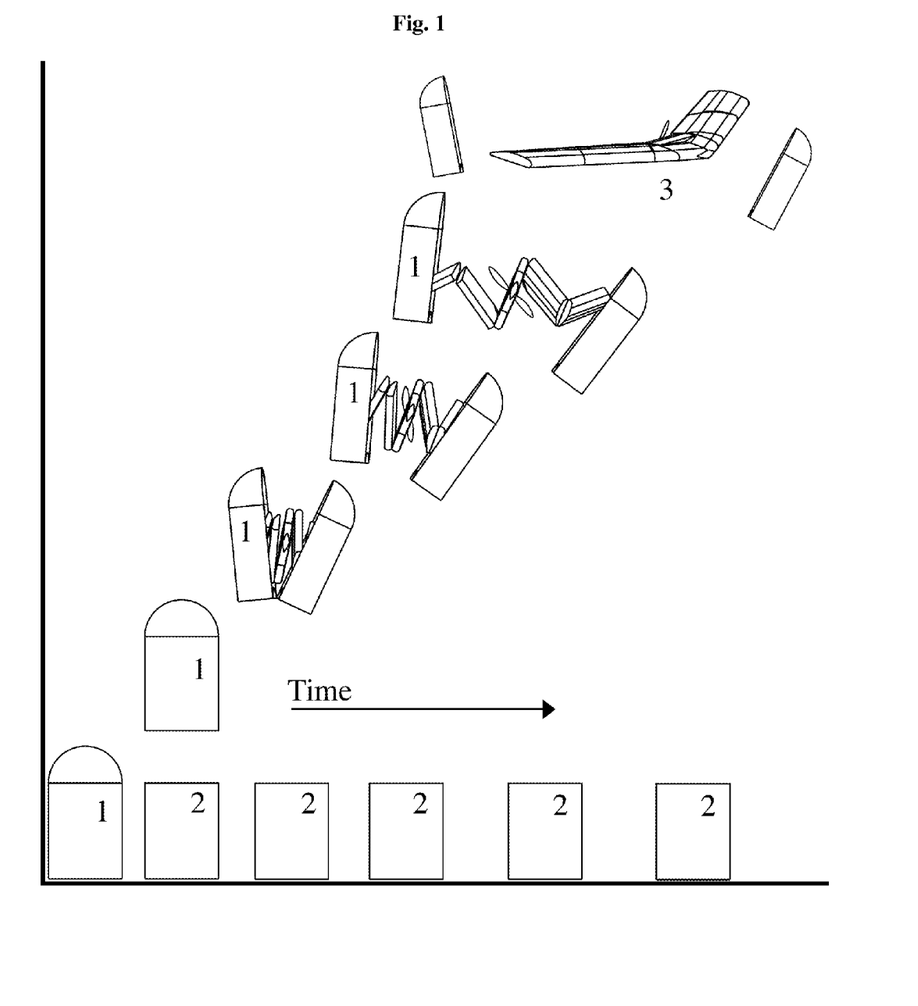
FIG. 1 is a perspective view of the UAV deployment sequence.
Figure 2:
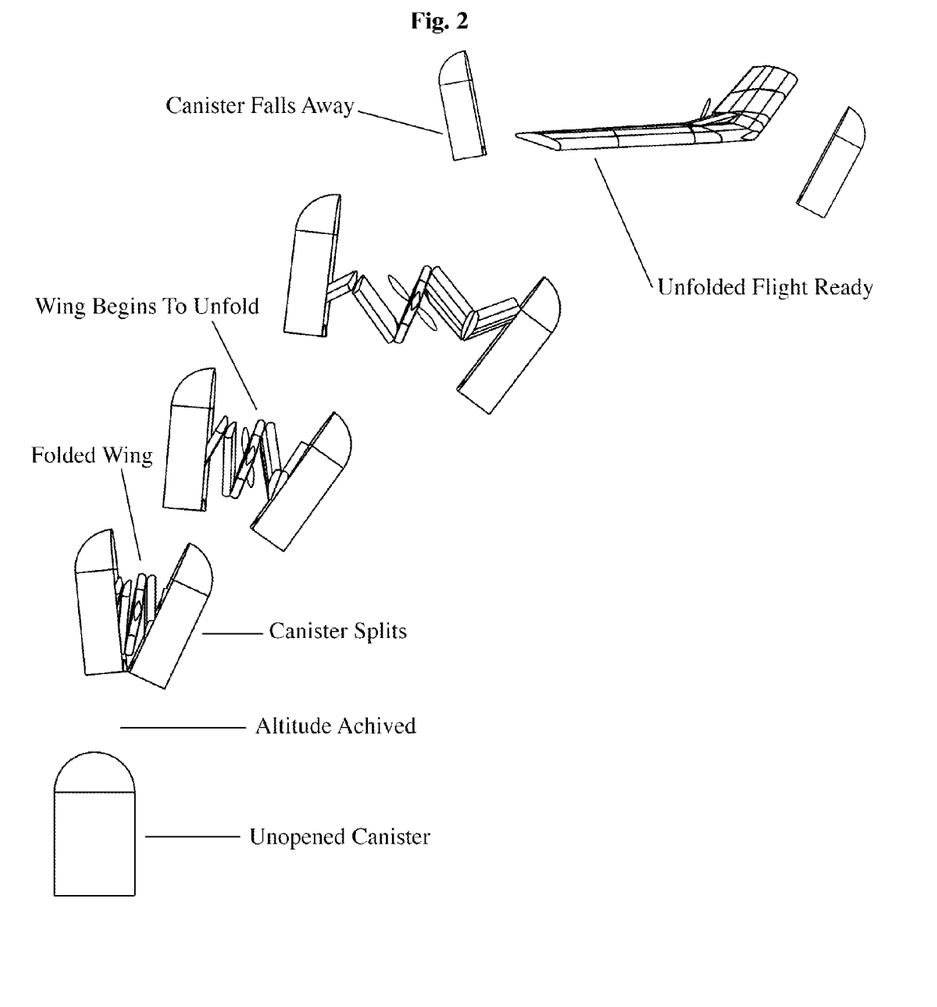
FIG. 2 is a perspective view of the UAV unfolding sequence.

FIG. 1 and FIG. 2 depict the UAV deployment sequence. When deployment of the UAV is initiated, the deployment canister 1 is ejected from the launch tube 2 by means of a pyrotechnic gas generator, compressed air supply, or other suitable propellant mechanism. When the canister 1 reaches sufficient altitude for deployment, the canister opens by means of an electronically triggered release mechanism Immediately following canister and UAV separation, the UAV wing unfolding and locking mechanism is activated and the UAV enters flight configuration 3.

Figure 3:
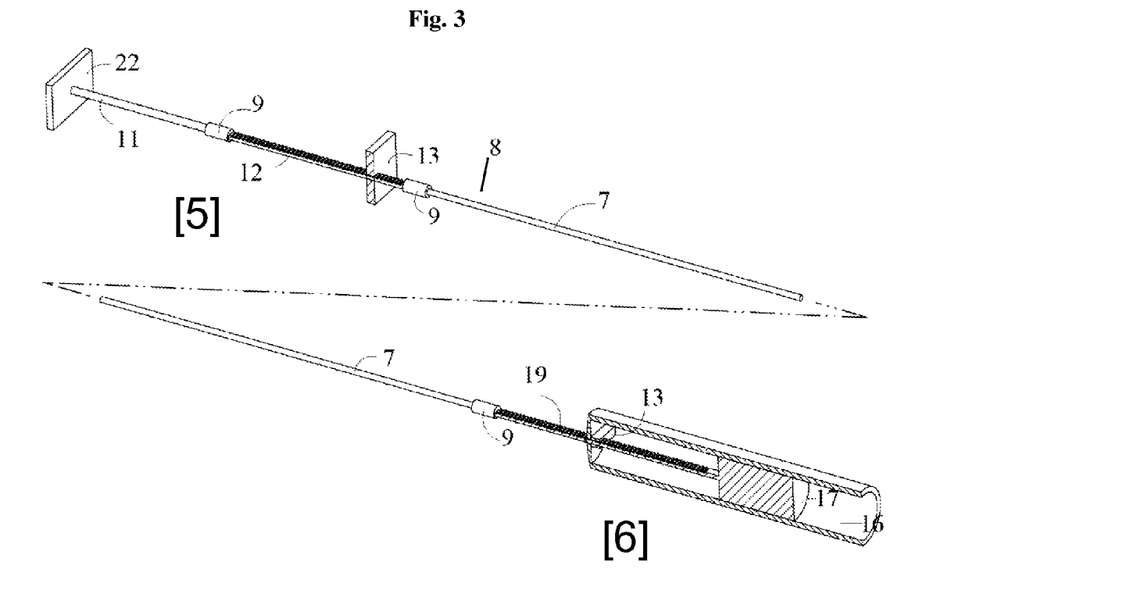
FIG. 3 is a perspective cutaway view of the primary and secondary wing-locking mechanisms.

FIG. 3 depicts both the primary [5] (see FIG. 5) and secondary [6] (see FIG. 6) components of the wing unfolding and locking mechanism. UAV wing locking is achieved through a dramatic and irreversible increase in tension in a non-elastic cord 7 embedded in and running along the length of the UAV wing and spanning adjacent hinged wing sections. The primary end of the locking cord 8 is attached to a primary tension device [5] by means of a coupler 9. This device provides the required force to unfold the wing from the stowed (folded) configuration into flight configuration when loss of containment by the canister occurs. Additionally, the primary tension device [5] prevents slack from forming in the locking cord as the wing is unfolded.

Figure 4:
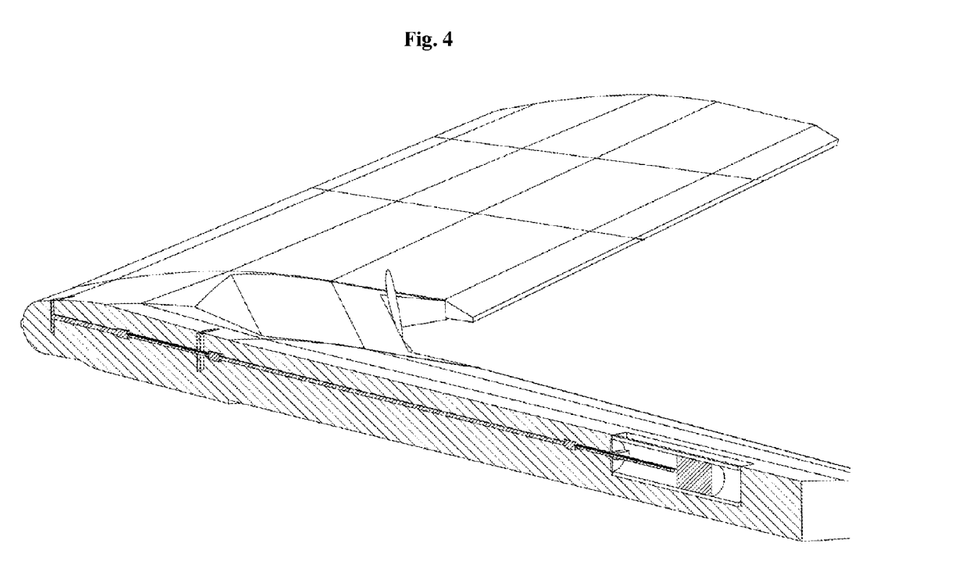
FIG. 4 is a perspective cutaway view of a foldable UAV wing with embedded primary and secondary wing-locking mechanisms.

FIG. 4 depicts a cutaway view of the primary and secondary locking mechanisms embedded in the wing. The ailerons are shown on the trailing edge of the multi-part wing. In one embodiment, each of the multi-part wing elements will have an aileron with an independent servo motor and cables or a control rod to control the aileron.

Figure 5:
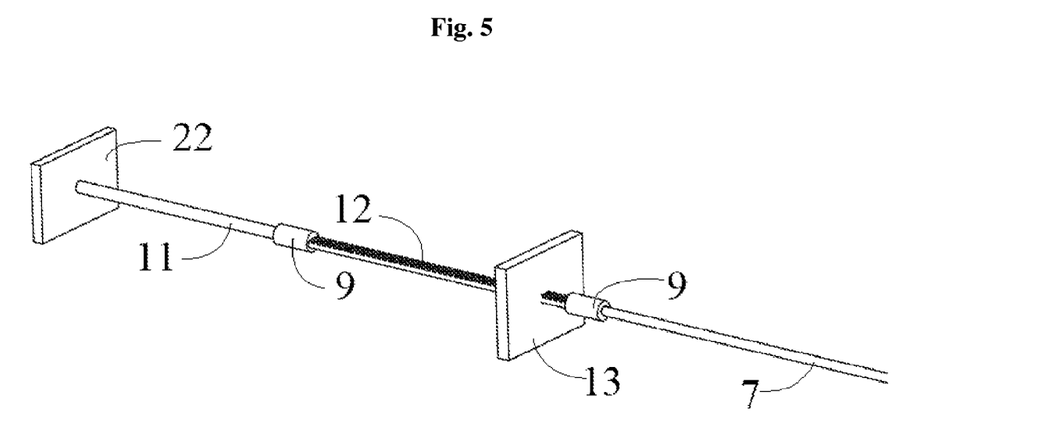
FIG. 5 is a perspective view of the primary wing-locking mechanism.

FIG. 5 depicts the primary tension device and the primary end of the locking cord to which the device is attached. In the current embodiment, the device is an elastic band 11 coupled with coupler 9 to a toothed bar 12 and ratchet mechanism 13 which ensures one-way displacement of the primary end of the locking cord as the wing is unfolded. The elastic band 11 is tensioned in the folded configuration, on the canister opening opening 11 pulls the toothed bar 12 through the ratchet mechanism 13, permanently tightening the inelastic locking cord 7. The tooth bar 12 is coupled with coupler 9 to the inelastic band 7. The elastic band is rigidly attached to the local wing section by means of an anchor 22.

Figure 6:
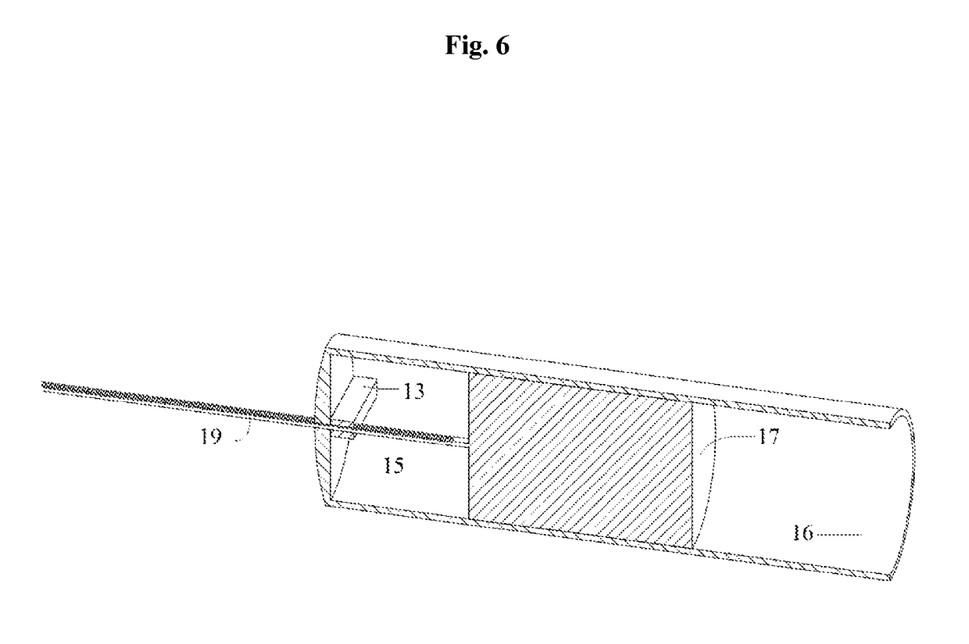
FIG. 6 is a perspective cutaway view of the secondary wing-locking mechanism.

FIG. 6 depicts the secondary tension device [6]. The secondary end of the locking cord is attached to a secondary tension device [6]. This device is activated when the wing unfolds into the fully open position and provides the final increase in tension required to lock the wing into flight-ready configuration. The device is comprised of an expandable chamber 15 including a pair of telescoping members 16 and 17. Member 16 is suitably secured to the wing section 18 in which the secondary tension device 6 is embedded. Member 17 is rigidly attached to a toothed bar 19 which passes through a ratchet mechanism 13 and is attached to the secondary end of the inelastic locking cord 7 by means of a coupler 9 (see FIG. 3). The ratchet mechanism 13 is rigidly attached to member 16 and ensures one-way displacement of the toothed bar 19. The expandable chamber 15 contains a pyrotechnic gas generating device, which consists of a rapidly combusting powder such as gunpowder and an igniter which allows for electronic detonation. Commercially available electronic igniters, such as Estes igniters, may be used. To initiate the locking stage, the pyrotechnic gas generating device is electronically triggered. Expansion of the pyrotechnic gas generating device causes subsequent expansion of the expandable chamber 15 and an associated displacement of member 17. The displacement of member 17 causes displacement of the toothed bar 19 to which it is rigidly attached, and the ratchet mechanism 13 ensures the said displacement is irreversible. When the unfolding and locking stages of the deployment process are complete, the UAV can begin mission operations.

Figure 7:
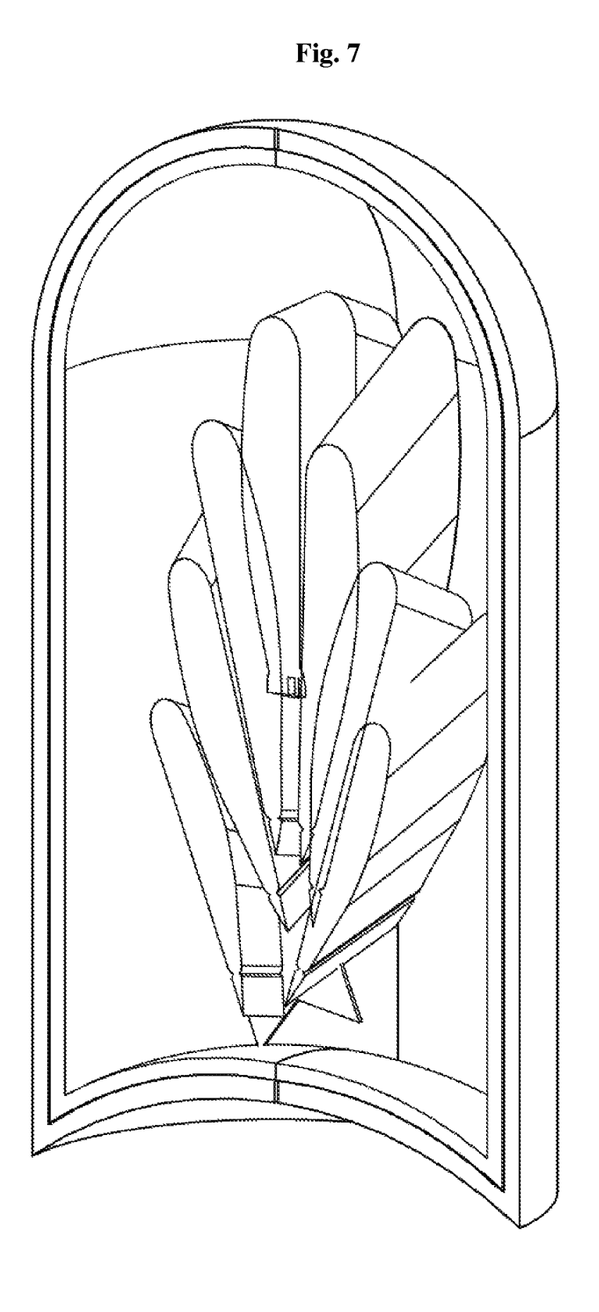
FIG. 7 is a perspective cutaway view of the launch canister in pre-deployment state.
Figure 8:
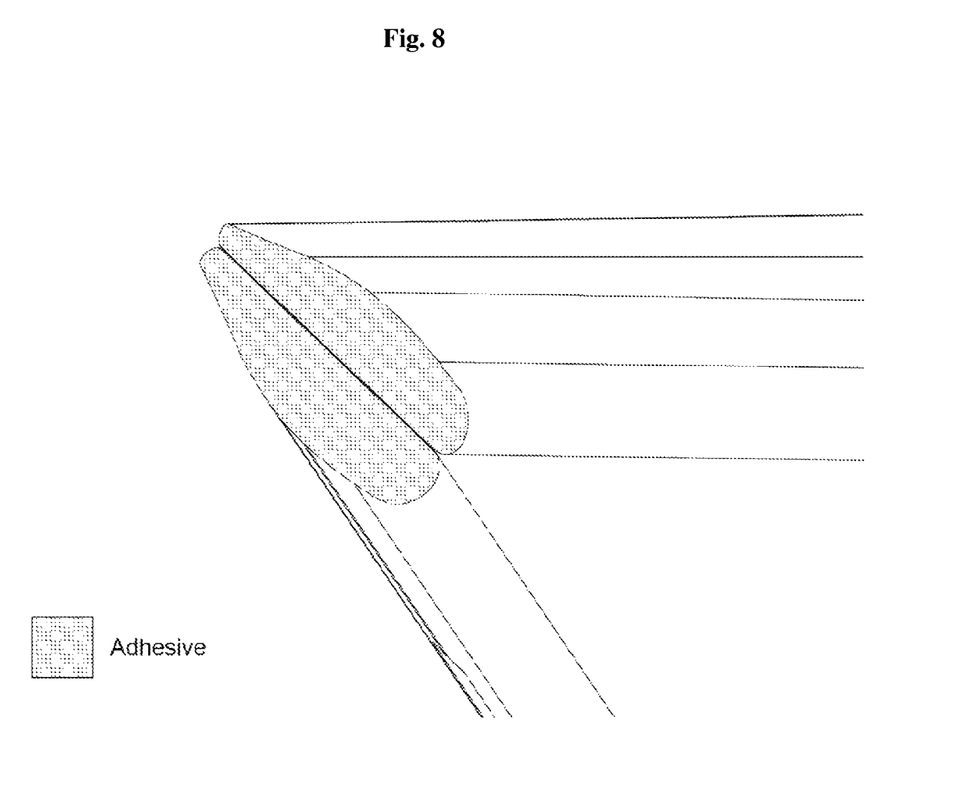
FIG. 8 is a perspective view of the adhesive wing-locking mechanism.
Figure 9:
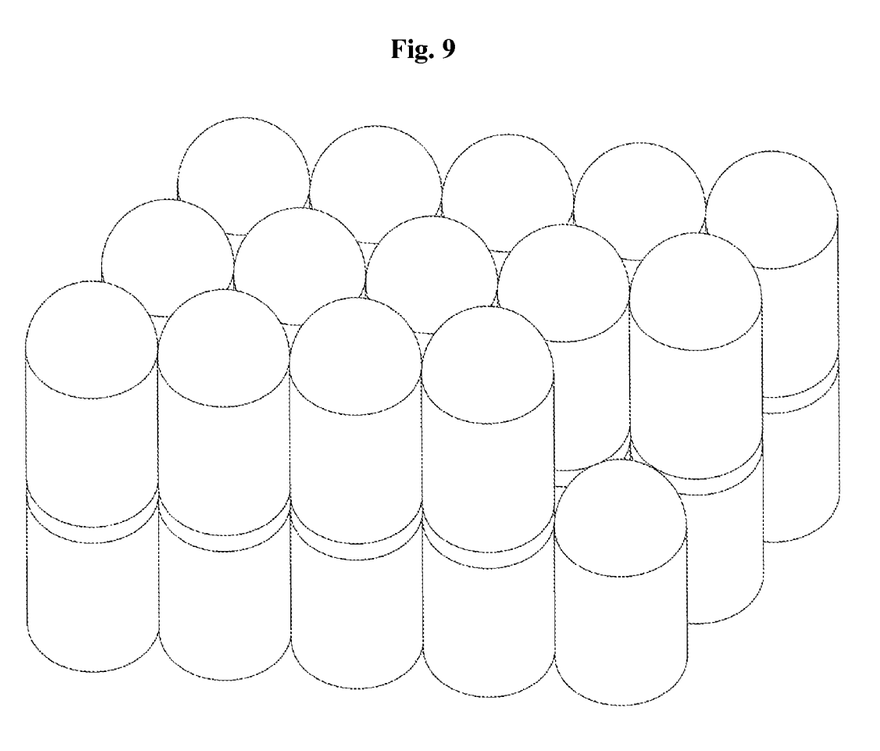
FIG. 9 is a perspective view of stackable UAV canisters.
Figure 10:
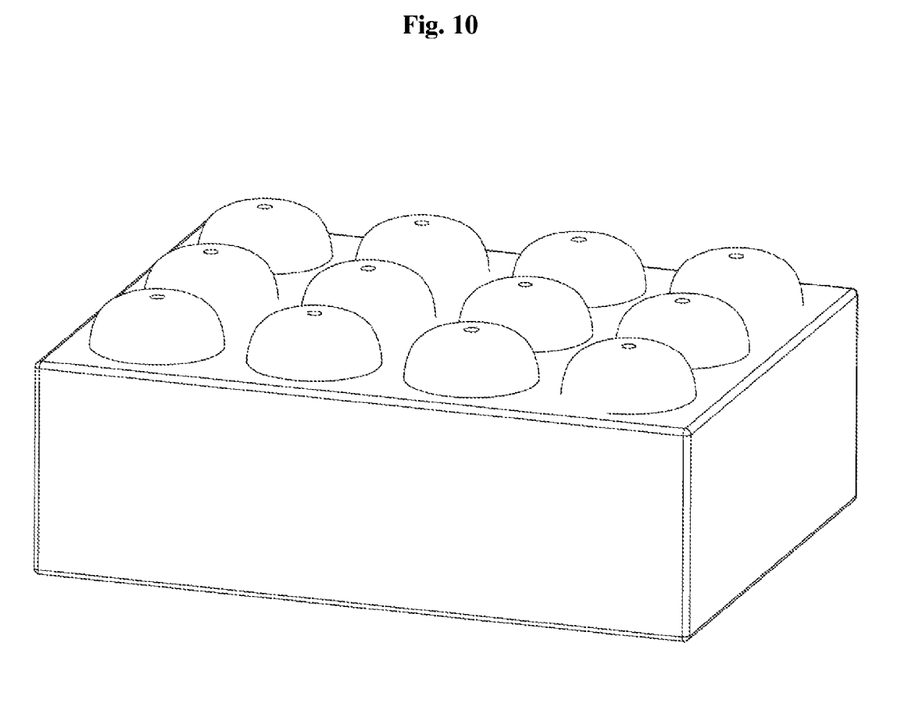
FIG. 10 is a perspective view of a UAV battery.

FIG. 7 shows the UAV in its folded configuration in the canister. FIG. 8 shows the adhesive on the end of each wing element. FIG. 9 shows the stackable canisters containing the UAV. FIG. 10 shows a battery of UAVs in their canisters.

It is to be understood that, while the invention has been described in conjunction with the detailed description, thereof, the foregoing description is intended to illustrate and not limit the scope of the invention. Other aspects, advantages, and modifications of the invention are within the scope of the claims set forth below. All publications, patents, and patent applications cited in this specification are herein incorporated by reference as if each individual publication or patent application were specifically and individually indicated to be incorporated by reference.

What is claimed is:

1. An unmanned aerial vehicle comprising:
   a fuselage;
   a multi-part foldable wing attached to the fuselage and configured to move between a folded stowed configuration and an unfolded flight configuration; and
   a deployable irreversible locking mechanism with a locking cord running along the length of the wing and spanning adjacent wing sections configured to irreversibly lock the multi-part foldable wing in the unfolded flight configuration wherein the multi-part foldable wing comprises a plurality of components that each comprise an adhesive-coated surface to adhere the components together in the unfolded flight configuration.

2. The unmanned aerial vehicle of claim 1, wherein the deployable locking mechanism is configured to be deployed by a pyrotechnic actuator.

3. The unmanned aerial vehicle of claim 1, wherein the unmanned aerial vehicle in the folded stowed configuration is contained in a launch canister.

4. The unmanned aerial vehicle of claim 3, wherein the launch canister is configured to be opened by an electronic triggering mechanism.

5. The unmanned aerial vehicle of claim 1, wherein the multi-part foldable wing is foam-filled or molded foam construction.

6. The unmanned aerial vehicle of claim 1, wherein the fuselage or the multi-part foldable wing has a camera.

7. The unmanned aerial vehicle of claim 1, wherein the adhesive in the adhesive-coated surface is a double-sided tape.

8. The unmanned aerial vehicle of claim 1, wherein the adhesive in the adhesive-coated surface is a paint-on adhesive.

9. A ground launched unmanned aerial vehicle comprising:
   a launch canister;

a fuselage;

a multi-part foldable wing attached to the fuselage and configured to move between a folded stowed configuration and an unfolded flight configuration;

wherein the multipart foldable wing and fuselage are configured to fit within the launch canister; and a deployable irreversible locking mechanism configured to irreversibly lock the multi-part foldable wing in the unfolded flight configuration wherein the multi-part foldable wing comprises a plurality of components that each comprise an adhesive-coated surface to adhere the components together in the unfolded flight configuration.

10. The ground launched unmanned aerial vehicle of claim 9, wherein the adhesive in the adhesive-coated surface is a double-sided tape.

11. The unmanned aerial vehicle of claim 9, wherein the adhesive in the adhesive-coated surface is a paint-on adhesive.

\* \* \* \* \*